United States Patent [19]

Davidson et al.

[11] 4,267,069

[45] May 12, 1981

[54] REGENERATION OF ACTIVATED CARBON TO INCREASE ITS GOLD ADSORPTION CAPACITY

[76] Inventors: Raymond J. Davidson, 5 Max Michaelis St., Montgomery Park, Johannesburg, Transvaal; Vittorio Veronese, 19 Lewis Dr., Horizon View, Roodepoort, Transvaal, South Africa

[21] Appl. No.: 80,158

[22] Filed: Sep. 28, 1979

[30] Foreign Application Priority Data

Oct. 18, 1978 [ZA] South Africa .................. 78/5864

[51] Int. Cl.³ .................... B01J 20/34; C22B 11/04; C22B 11/08
[52] U.S. Cl. .................... 252/412; 75/118 R; 210/694; 252/413; 423/25; 423/27; 423/35
[58] Field of Search ............ 252/412, 413; 75/118 R; 423/25, 27, 35, 43, 143; 210/40, 39

[56] References Cited

U.S. PATENT DOCUMENTS

| | | | |
|---|---|---|---|
| 3,920,403 | 11/1975 | Ross | 204/110 |
| 3,935,006 | 1/1976 | Fisher | 75/118 R |
| 3,970,737 | 7/1976 | Davidson | 423/27 |
| 4,094,668 | 6/1978 | Yannopoulos et al. | 75/99 |
| 4,155,983 | 5/1979 | Zaleski | 75/118 R |
| 4,208,378 | 6/1980 | Heinen et al. | 423/27 |

FOREIGN PATENT DOCUMENTS 2009120 3/1971 Fed. Rep. of Germany ............ 210/40
2252113 6/1975 France .

OTHER PUBLICATIONS

Chem. Abs.-vol. 84, No. 4-1/26/76-p. 318, No. 21847f.
J. of Applied Chemistry of the U.S.S.R.-vol. 50, No. 3.1, Mar. 1977-pp. 504-506, New York, A. L. Grabovskii et al.

*Primary Examiner*—P. E. Konopka

[57] ABSTRACT

A method of regenerating an activated carbon which has had its collecting capacity for gold adsorption reduced through use which includes the step of contacting the carbon with an aqueous copper salt solution having a pH of less than 6. The regeneration is improved if the solution contains carbonic acid or if the copper salt solution treatment is followed by treatment with a carbonate or bicarbonate solution.

17 Claims, No Drawings

REGENERATION OF ACTIVATED CARBON TO INCREASE ITS GOLD ADSORPTION CAPACITY

This invention relates to the regeneration of activated carbon.

Conventionally gold values are recovered from an ore by finely milling the ore and leaching the milled ore with a suitable cyanide solution. After filtration and clarification of the solution, the gold values are precipitated from the solution by means of zinc. Gold is also recovered from solution by means of activated carbon. The gold values are adsorbed on to the activated carbon from the solution and then eluted therefrom, e.g. using deionised or otherwise softened water. Contact between the solution and activated carbon may take place in an elution column. The solution may also be contacted with the activated carbon while it is still a pulp.

A particular process for recovering gold and other metal values from solution using activated carbon is that described and claimed in U.S. Pat. No. 3,970,737.

The activated carbon has its collecting capacity for gold adsorption reduced through use and this invention concerns the regeneration of activated carbon, the collecting capacity of which has been so reduced.

According to the invention, a method of regenerating an activated carbon which has had its collecting capacity for gold adsorption reduced through use, includes the step of contacting the carbon with an aqueous copper salt solution having a pH of less than 6. The aqueous solution may be a copper chloride, a copper nitrate, or preferably a copper sulphate solution. Such solutions will generally contain up to 5 percent by weight of the copper salt.

The collecting capacity for gold adsorption or equilibrium capacity constant of activated carbon may be determined by standard methods as, for example, that described in the article "The mechanism of gold adsorption on activated carbon" by R. J. Davidson, Journal of the S.A. Institute of Mining and Metallurgy, 75 (4), November, 1974, at page 67.

The mildly acidic copper salt solution preferably also contains carbonic acid. The carbonic acid may be produced in situ by bubbling carbon dioxide through the solution, or by the addition of a suitable bicarbonate or carbonate salt, such as sodium carbonate. Preferably in the case of bubbling $CO_2$ through the copper salt solution the solution is saturated with carbon dioxide and this may take place in some instances at elevated pressures.

According to another aspect of the invention, the carbon is contacted with the copper salt solution (without carbonic acid or other carbonate additions) and is thereafter contacted with a solution of a suitable carbonate salt such as ammonium carbonate or bicarbonate salt. Ammonium carbonate is the preferred salt due to its ability to complex any excess adsorbed copper which will thereafter be eluted from the carbon.

The carbonate or bicarbonate solution whether added to the copper salt solution or used separately, will generally contain up to 5 percent by weight carbonate or bicarbonate.

Contact between the carbon and the copper salt solution may be achieved by agitating the carbon in the solution. Preferably, the carbon to be regenerated is placed in a column and the regeneration solution or solutions then passed through the column, either individually or sequentially.

The solution or solutions may be contacted with the carbon at ambient temperature or preferably at an elevated temperature such as 90° to 110° C.

In particular, the method of the invention has application to the regeneration of activated carbon, the equilibrium constant of which has been reduced from use in the method described and claimed in U.S. Pat. No. 3,970,737.

Examples of the invention will now be described.

EXAMPLE 1

An activated carbon had its collecting capacity for gold adsorption reduced from 37 mg Au/gC to 25 by use in a known gold recovery process. This carbon was placed in an elution column of 25 ml volume. A copper sulphate solution of concentration 2 to 3% by mass was prepared. Carbon dioxide was bubbled through the copper sulphate solution at the rate of 1 lm at ambient temperature and pressure until the solution was saturated with carbon dioxide. At this point the pH of the solution was 3,5. The copper sulphate solution, at room temperature, saturated with carbon dioxide, was then pumped into the elution column which was maintained at 91° C. 5 bed volumes (125 ml) of the heated copper sulphate solution were passed through the elution column at the rate of 5 bed volumes per hour. The carbon was removed from the column and was found to have had its collecting capacity increased to 37 mg Au/gC again.

EXAMPLE 2

Type G215 coconut shell carbon having a collecting capacity for gold adsorption of 37 mg Au/gC at pH 10 was used to adsorb gold from an acidified gold plant pregnant solution at pH 4–5. After loading 2–4% Au, the carbon was eluted at 91° C. using deionized water. The eluted carbon had a capacity constant of 25 mg Au/gC.

The eluted carbon was maintained at 91° C. and treated with solutions of copper sulphate, ammonium carbonate and soda water either individually, sequentially or as mixtures as set out in Table 1 below:

TABLE 1

| A-1 bed volume $CuSO_4$ solution (% $CuSO_4 \cdot 5H_2O$/ hours treatment time) | B-5 bed volumes $(NH_4)_2CO_3$ solution (% $(NH_4)_2CO_3$/ hours treatment time) | Treatment sequence | Collecting capacity of used carbon (mg Au/g C) |
|---|---|---|---|
| Nil | Nil | | 25 |
| 2,0/1 | | A only | 28 |
| 2,5/1 | | A only | 28 |
| 3,0/1 | | A only | 28 |
| | 2,0/2,5 | B only | 28 |
| | 3,0/2,5 | B only | 28 |
| | 5,0/2,5 | B only | |
| 0,5/½ | 2,0/2,5 | A + B | 32 |
| 1,0/½ | 2,0/2,5 | A + B | 33 |
| 2,0/½ | 2,0/2,5 | A + B | 35 |
| 2,5/½ | 2,0/2,5 | A + B | 36 |
| 3,0/½ | 2,0/2,5 | A + B | 36 |
| 2,0/1 but saturated with $CO_2$ | | A only | 37 |
| 2,5/1 but saturated with $CO_2$ | | A only | 38 |
| 3,0/1 but saturated with $CO_2$ | | | |

EXAMPLE 3

A similar series of regeneration experiments to those of Example 2 were carried out using a variety of copper sulphate/ammonium carbonate contact solutions and comparisons made with other metal salt solutions such as nickel sulphate, zinc sulphate and iron sulphate solutions. The results of these experiments are set out in Table 2 below. The significant regeneration of activated carbon using treatment solutions of the invention will be seen from these results.

In Table 2, all percentages given are percentages by weight and BV/h stands for bed volumes/hour.

TABLE 2

Virgin Carbon 37 mg Au/gC

The charcoal was loaded with WOL Au pregnant solution at pH 10 for 48 h. The charcoal was eluted using 5% NaCN and 1% NaOH (1BV) in contact for 30 min. followed by 5 BV of deionized water - at 91° C. - The charcoal has an initial capacity of 25 mg Au/gC after elution.

| Test No. | Reagent (1) | Bed Volume | Reagent (2) | Bed Volume | Contact Reagent (1) Min. | Contact Reagent (2) Min |
|---|---|---|---|---|---|---|
| CR1 | 0,5% $NiSO_4 \cdot 6H_2O$ | 1 | 2% $(NH_4)_2CO_3$ | 5 | 30 | passed |
| CR2 | 1,0% $NiSO_4 \cdot 6H_2O$ | 1 | 2% $(NH_4)_2CO_3$ | 5 | 30 | " |
| CR3 | 2,0% $NiSO_4 \cdot 6H_2O$ | 1 | 2% $(NH_4)_2CO_3$ | 5 | 30 | " |
| CR4 | 2,0% $NiSO_4 \cdot 6H_2O$ | 1 | — | — | 30 | — |
| CR5 | — | — | 2% $(NH_4)_2CO_3$ | 5 | — | passed |
| CR6 | 2% $NiSO_4 \cdot 6H_2O$ | 1 | 2% $(NH_4)_2CO_3$ | 5 | 60 | " |
| CR7 | 2% $NiSO_4 \cdot 6H_2O$ | 1 | $CO_2$ gas | 1l/min | 30 | " |
| CR8 | 3% $NiSO_4 \cdot 6H_2O$ | 1 | 2% $(NH_4)_2CO_3$ | 5 | 30 | " |
| CR9 | 0,5% $ZnSO_4 \cdot 7H_2O$ | 1 | 2% $(NH_4)_2CO_3$ | 5 | 30 | " |
| CR10 | 1,0% $ZnSO_4 \cdot 7H_2O$ | 1 | 2% $(NH_4)_2CO_3$ | 5 | 30 | " |
| CR11 | 2,0% $ZnSO_4 \cdot 7H_2O$ | 1 | 2% $(NH_4)_2CO_3$ | 5 | 30 | " |
| CR12 | 3,0% $ZnSO_4 \cdot 7H_2O$ | 1 | 2% $(NH_4)_2CO_3$ | 5 | 30 | " |
| CR13 | 2% $ZnSO_4 \cdot 7H_2O$ | 1 | $CO_2$ gas | 1l/min | 30 | " |
| CR14 | 2% $ZnSO_4 \cdot 7H_2O$ | 1 | 2% $(NH_4/_2CO_3$ | 5 | 60 | " |
| CR15 | 0,5% $FeSO_4 \cdot 7H_2O$ | 1 | 2% $(NH_4)_2CO_3$ | 5 | 30 | " |
| CR16 | 1,0% $FeSO_4 \cdot 7H_2O$ | 1 | 2% $(NH_4)_2CO_3$ | 5 | 30 | " |
| CR17 | 2,0% $FeSO_4 \cdot 7H_2O$ | 1 | 2% $(NH_4)_2CO_3$ | 5 | 30 | " |
| CR18 | 0,5% $CuSO_4$ | 1 | 2% $(NH_4)_2CO_3$ | 5 | 30 | " |
| CR19 | 1,0% $CuSO_4$ | 1 | 2% $(NH_4)_2CO_3$ | 5 | 30 | " |
| CR20 | 2,0% $CuSO_4$ | 1 | 2% $(NH_4)_2CO_3$ | 5 | 30 | " |
| CR21 | 2,0% $CuSO_4$ | 1 | 2% $(NH_4)_2CO_3$ | 5 | 30 | " |
| CR22 | 2,5% $CuSO_4$ | 1 | 2% $(NH_4)_2CO_3$ | 5 | 30 | " |
| CR23 | 3,0% $CuSO_4$ | 1 | $(NH_4)_2CO_3$ | 5 | 30 | " |
| CR24 | 2,5% $CuSO_4$ | 1 | 5% $(NH_4)_2CO_3$ | 5 | 30 | " |
| CR25 | 3,0% $CuSO_4$ | 1 | 5% $(NH_4)_2CO_3$ | 5 | 30 | " |
| CR26 | 2,0% $CuSO_4$ | 1 | $CO_2$ gas into the $CuSO_4$ | 1l/min | 30 | — |
| CR27 | 2,5% $CuSO_4$ | 1 | | | 30 | — |
| CR28 | 3,0% $CuSO_4$ | 1 | | | 30 | — |
| CR29 | 2,0% $CuSO_4$ | 1 | $CO_2$ gas only | 1l/min | 30 | — |
| CR30 | 2,5% $CuSO_4$ | 1 | | | 30 | — |
| CR31 | 3,0% $CuSO_4$ | 1 | | | 30 | — |
| CR32 | 2,0% $CuSO_4$ | 1 | — | — | 60 | — |
| CR33 | 2,5% $CuSO_4$ | 1 | — | — | 60 | — |
| CR34 | 3,0% $CuSO_4$ | 1 | — | — | 60 | — |
| CR35 | — | — | 2% $(NH_4)_2CO_3$ | 5 | — | passed |
| CR36 | — | — | 3% $(NH_4)_2CO_3$ | 5 | — | " |
| CR37 | — | — | 5% $(NH_4)_2CO_3$ | 5 | — | " |
| CR41 | 2% $CuSO_4$ | 1 | 2% $NaHCO_3$ | 5 | 30 | " |
| CR42 | " | 1 | 5% $NaHCO_3$ | 1 | 30 | " |
| CR43 | " | 1 | 5% $NaHCO_3$ | 1 | 30 | 30 min |
| CR44 | " | 1 | 2% $(NH_4)_2CO_3$ | 1 | 30 | 30 min |

TABLE 2-continued

Virgin Carbon 37 mg Au/gC

The charcoal was loaded with WOL Au pregnant solution at pH 10 for 48 h. The charcoal was eluted using 5% NaCN and 1% NaOH (1BV) in contact for 30 min. followed by 5 BV of deionized water - at 91° C. - The charcoal has an initial capacity of 25 mg Au/gC after elution.

| | | | | | | |
|---|---|---|---|---|---|---|
| CR45 | " | 1 | 5% $(NH_4)_2CO_3$ | 1 | 30 | 30 min |

| | FLOW RATE | | | | | |
|---|---|---|---|---|---|---|
| Test No. | Reagent (1) BV/h | Reagent (2) BV/h | Water after each Reag. BV/h | Bed Volume of Water | Capacity after Regeneration mgAu/gC | ppmCu in the charcoal |
| CR1 | 2 | 2 | 2 | 2 | 25 | |
| CR2 | 2 | 2 | 2 | 2 | 25 | |
| CR3 | 2 | 2 | 2 | 2 | 27 | |
| CR4 | 2 | — | 2 | 2 | 26 | |
| CR5 | — | 2 | 2 | 2 | 26 | |
| CR6 | 2 | 2 | 2 | 2 | 25 | |
| CR7 | 2 | 30 min | 2 | 2 | 26 | |
| CR8 | 2 | 2 | 2 | 2 | 26 | |
| CR9 | 2 | 2 | 2 | 2 | 24 | |
| CR10 | 2 | 2 | 2 | 2 | 24 | |
| CR11 | 2 | 2 | 2 | 2 | 24 | |
| CR12 | 2 | 2 | 2 | 2 | 24 | |
| CR13 | 2 | 30 min | 2 | 2 | 24 | |
| CR14 | 2 | 2 | 2 | 2 | 25 | |
| CR15 | 2 | 2 | 2 | 2 | 25 | |
| CR16 | 2 | 2 | 2 | 2 | 27 | |
| CR17 | 2 | 2 | 2 | 2 | 26 | |
| CR18 | 2 | 2 | 2 | 2 | 32 | 3070 |
| CR19 | 2 | 2 | 2 | 2 | 33 | 4600 |
| CR20 | 2 | 2 | 2 | 2 | 35 | 5500 |
| CR21 | 2 | 2 | 2 | 2 | 35 | 7137 |
| CR22 | 2 | 2 | 2 | 2 | 36 | 8800 |
| CR23 | 2 | 2 | 2 | 2 | 36 | 11162 |
| CR24 | 2 | 2 | 2 | 2 | 35 | 5700 |
| CR25 | 2 | 2 | 2 | 2 | 35 | 6225 |
| CR26 | 2 | — | 2 | 2 | 37 | 12150 |
| CR27 | 2 | — | 2 | 2 | 38 | 11562 |
| CR28 | 2 | — | 2 | 2 | 38 | 13975 |
| CR29 | 2 | 60 min | 2 | 2 | 37 | 12600 |
| CR30 | 2 | 60 min | 2 | 2 | 38 | 14050 |
| CR31 | 2 | 60 min | 2 | 2 | 38 | 14475 |
| CR32 | 2 | — | 2 | 2 | 28 | 15650 |
| CR33 | 2 | — | 2 | 2 | 28 | 16175 |
| CR34 | 2 | — | 2 | 2 | 28 | 16750 |
| CR35 | — | 2 | 2 | 2 | 28 | — |
| CR36 | — | 2 | 2 | 2 | 28 | — |
| CR37 | — | 2 | 2 | 2 | 28 | — |
| CR41 | 2 | 2 | 2 | 2 | 32 | 9900 |
| CR42 | 2 | 2 | 2 | 2 | 31 | 10862 |
| CR43 | 2 | 2 | 2 | 2 | 32 | 10400 |
| CR44 | 2 | 2 | 2 | 2 | 32 | 8781 |
| CR45 | 2 | 2 | 2 | 2 | 33 | 7025 |

We claim:

1. A method of regenerating an activated carbon which has had its collecting capacity for gold adsorption reduced through use, includes the step of contacting the carbon with an aqueous copper salt solution having a pH of less than 6.

2. A method of claim 1 wherein the copper salt solution is a copper chloride or copper nitrate solution.

3. A method of claim 1 wherein the copper salt solution is a copper sulphate solution.

4. A method of claim 1 wherein the copper salt solution contains up to 5 percent by weight of the copper salt.

5. A method of claim 1 wherein the copper salt solution also contains carbonic acid.

6. A method of claim 5 wherein the carbonic acid is produced in situ by bubbling carbon dioxide through the solution.

7. A method of claim 6 wherein the solution is saturated with carbon dioxide.

8. A method of claim 5 wherein the carbonic acid is produced in situ by adding a suitable carbonate or bicarbonate salt to the solution.

9. A method of claim 8 wherein the carbonate salt is added in an amount of up to five percent by weight of the solution.

10. A method of regenerating an activated carbon which has had its collecting capacity for gold adsorption reduced through use, includes the step of contacting the carbon with an aqueous copper salt solution containing up to 5 percent by weight of the copper salt and also containing carbonic acid.

11. A method of claim 10 wherein the solution is saturated with carbonic acid produced by bubbling carbon dioxide through the solution.

12. A method of claim 11 wherein the copper salt solution is a copper sulphate solution.

13. A method of claim 1 wherein contact between the copper salt solution and the carbon is followed by contacting the carbon with a suitable carbonate or bicarbonate solution.

14. A method of claim 13 wherein the carbonate is ammonium carbonate.

15. A method of claim 13 wherein the carbonate or bicarbonate solution contains up to five percent by weight of the carbonate or bicarbonate.

16. A method of claim 13 wherein contact between the carbon and the solution or solutions is achieved by agitating the carbon in the solution or solutions.

17. A method of claim 13 wherein contact between the carbon and the solution or solutions is achieved by placing the carbon in a column and passing the solution or solutions through the column.

* * * * *